April 17, 1956 — W. P. MANSFIELD — 2,742,027
PISTON MEANS FOR VARYING THE CLEARANCE VOLUME
OF AN INTERNAL-COMBUSTION ENGINE
Filed June 8, 1953 — 3 Sheets-Sheet 1

Inventor:
Wilfred Percival Mansfield,
by
Attorney

April 17, 1956 W. P. MANSFIELD 2,742,027
PISTON MEANS FOR VARYING THE CLEARANCE VOLUME
OF AN INTERNAL-COMBUSTION ENGINE
Filed June 8, 1953 3 Sheets-Sheet 2

Inventor:
Wilfred Percival Mansfield,
by
Attorney

April 17, 1956 W. P. MANSFIELD 2,742,027
PISTON MEANS FOR VARYING THE CLEARANCE VOLUME
OF AN INTERNAL-COMBUSTION ENGINE
Filed June 8, 1953 3 Sheets-Sheet 3

Inventor:
Wilfred Percival Mansfield,
by Eugene de Purdy
Attorney

United States Patent Office 2,742,027
Patented Apr. 17, 1956

2,742,027

PISTON MEANS FOR VARYING THE CLEARANCE VOLUME OF AN INTERNAL-COMBUSTION ENGINE

Wilfred Percival Mansfield, Slough, England, assignor, by mesne assignments, to The British Internal Combustion Engine Research Association, Slough, England Application June 8, 1953, Serial No. 360,243

Claims priority, application Great Britain June 10, 1952

7 Claims. (Cl. 123—78)

This invention relates to internal combustion engines and in particular to a method and means for varying the clearance volume in a cylinder of an internal combustion engine, while the object of the invention is to increase the efficiency of an internal combustion engine in a simple, efficient and economical manner.

The invention consists in a method of varying the clearance volume in the cylinder of an internal combustion engine comprising varying the distance between a part at least of the crown of the piston and the connection between the piston and the means provided for converting the reciprocating motion of the piston into the rotary motion.

The invention further consists in a piston for an internal combustion engine characterised in that part at least of the crown of the same is variable as to distance from the connection between the piston and the means provided for converting the reciprocating motion of the piston into the rotary motion to change the clearance volume of the cylinder in which it works.

The invention still further consists in an internal combustion engine having one or more cylinders in the or each of which is provided a piston comprising at least two portions, one of which is connected to the small end of the connecting rod, while the other, which forms part of the boundary of the combustion chamber is movable in relation to the first part in such a way as to change the clearance volume.

The invention still further consists in a construction in which the change of clearance volume is effected automatically with variation of the maximum gas pressure in the or each cylinder, said change being effected by the controlled movements of a fluid under the action of the gas pressure and the inertia of the part of the piston.

The invention still further consists in a construction as set forth in the preceding paragraph in which the piston is formed in two parts and the movement of the fluid is into and out of a chamber or chambers formed between the two parts, the movement of the fluid being controlled by non-return inlet valves and spring loaded discharge valves and/or discharge orifices arranged and adjusted to give the required changes in position of the adjustable part of the piston in accordance with the engine load.

The invention still further consists in an internal combustion engine in which the clearance volume of the or each cylinder is variable by the method or a construction as set forth above and in which the engine includes an air or air-fuel mixture delivery machine which is variable to vary the amount of air or mixture delivered to the engine.

The invention still further consists in an internal combustion engine in which the clearance volume of the or each cylinder is variable by the method or a construction as set forth above and in which the engine is turbo-charged and in which the effective compression stroke is less than the effective expansion stroke.

In the common design of a piston type internal combustion engine, the volumetric compression ratio is fixed. In some classes of internal combustion engine improved performance can be obtained by adjusting the compression ratio in accordance with the engine load. For example in the case of petrol engines, the value selected for the fixed compression ratio is that at which the engine just commences to knock at full throttle on the available fuel. At any load less than the maximum, a higher compression ratio can be used with a consequent improvement in fuel economy. Thus, at one third of maximum load, the engine can operate without knocking with a compression ratio about twice as great as the limiting value at maximum load, giving a reduction in fuel consumption of about 30 percent. In pressure charged engines of this type similar and even greater improvements are obtainable, since the range of charge pressures is extended. Particularly is this so in the case of piston type aircraft engines as suitable pressure chargers are provided to maintain ground-level intake pressures at altitude, and these cannot normally be used to obtain extra power for take-off, since the amount of pressure-charging usable at ground-level is limited by detonation, when a fixed compression ratio giving satisfactory economy under cruising conditions is used. With variable ratio pistons however the full extent of pressure-charging may be employed for take-off, the pistons automatically giving the required low ratio, while a ratio higher than the compromise value previously chosen is automatically provided for cruising.

In the case of a turbo-charged compression-ignition engine, the fixed compression ratio chosen is that which at maximum load gives maximum cylinder pressures not exceeding some limiting value, beyond which excessive loads would be imposed on the engine structure. At all part load conditions of running, the maximum pressure falls below the limiting value, partly as a result of the reduced pressure of the air supplied by the turbo-charger, and partly because of the smaller quantity of fuel burned during each combustion process. Thus, here again, an increase of compression ratio with reduction of engine load is permissible and improves thermal efficiency. Moreover such a provision overcomes the problem of starting highly pressure charged engines, which normally have low fixed compression ratios to suit full load operation, and this already serious problem will become even more serious as the degree of pressure-charging is increased. Even in the case of engines having mechanically driven compressors and atmospherically-charged compression ignition engines, improvements in starting and fuel-economy are effected by suitable variations of the compression ratio.

In accordance with the invention there is provided means whereby the compression ratio of an engine is automatically varied mainly in accordance with the maximum gas pressure acting on the piston, thereby to obtain at each condition of operation of the engine the highest permissible compression ratio. To this end a self-adjusting piston is used in place of the normal piston. The piston comprises at least two portions, one of which is connected to the small end of the connecting rod by any of the known means while the other, which forms part of the boundary of the combustion chamber, is movable in relation to the first part, in such a way as to change the clearance volume. The required movement is controlled by the passage of oil (which may be taken from the normal lubricating oil system of the engine) into and out of a chamber or chambers formed between the two parts of the piston. These movements of the oil maybe controlled by non-return inlet valves and spring-loaded discharge valves and/or discharge orifices arranged and adjusted to give the required changes in position of the adjustable part of the piston in accordance with the engine load.

Additional advantages of the present arrangement are that in the four-stroke cycle applications variations with speed, of the value of the inertia effect of the fluid and the part of the piston not connected to the rod, can be arranged to give a desired variation in the relative position of the two or more parts of the piston with variation in the speed of the engine. Moreover, these inertia forces can be used to assist the entry of oil to the chamber or chambers, thereby permitting the use of a low pressure supply of oil.

The arrangement in accordance with the invention can be applied to a piston without any considerable increase in the weight thereof since the thickness of the crown can be reduced owing to the form of construction used.

In the various forms of construction of pistons described hereafter it will be assumed that the pistons are working in vertical cylinders with the combustion chamber uppermost, but of course, they may be used in cylinders occupying any other position.

The accompanying drawings show, by way of example only, a number of embodiments of the invention in which.

Figure 1:
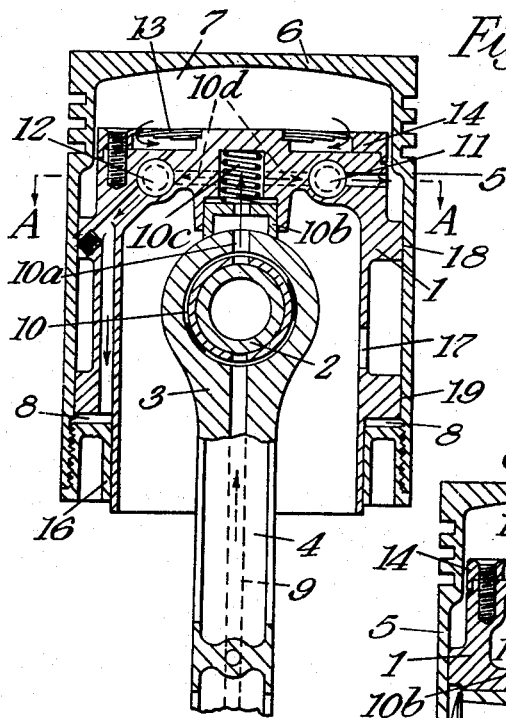
Figure 1 is a cross section of one form of piston.
Figure 2:
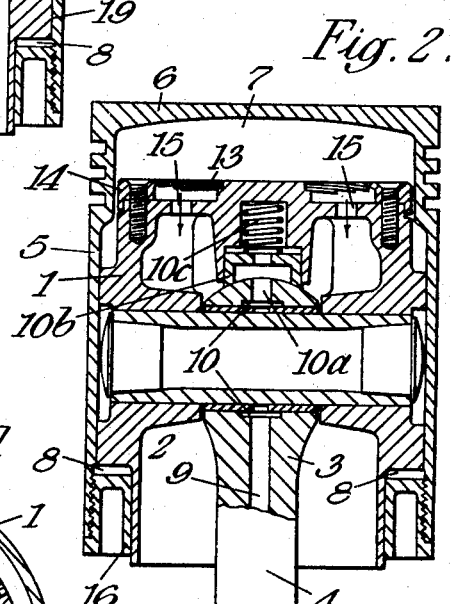
Figure 2 is a cross section of the same piston taken at right angles to that of Figure 1.
Figure 3:
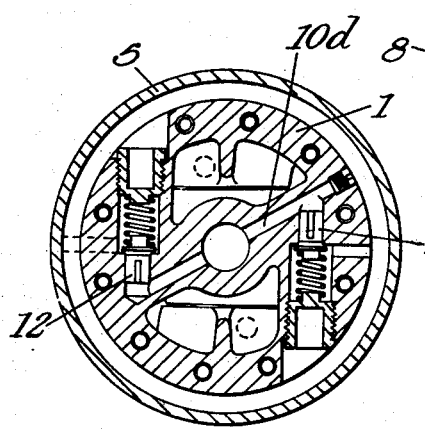
Figure 3 is a plan taken on the line A—A of Figure 1.

In one construction in accordance with the invention there is provided in each cylinder of an internal combustion engine of the four stroke cycle type a piston as shown in Figures 1, 2 and 3 and formed in two main parts each of cup-like shape both having their open ends facing towards the crank shaft or other means of converting reciprocating motion into rotary motion, the one being positioned within the other. The upper end or crown 6 of the outer cup-like shaped member 5 forms the head of the piston proper and presents a surface of normal contours to the combustion chamber and is provided with piston rings in the normal positions, while the inner cup-like member 1 is slidable within and axially of the outer member. The inner member 1 is attached in the normal manner by means of a piston pin 2 to the small end 3 of a connecting rod 4. The axial movement of the outer member in relation to the inner one effects changes in the clearance volume of the cylinder above the crown 6. A chamber 7 is formed between the upper surface of the inner member 1 and the lower surface of the crown 6 while a lower annular chamber 8 is formed by a rebate in the bottom of the wall of the inner cup-like shaped member, said lower chamber 8 being bounded on the inner and upper surfaces by the two surfaces of the rebate in the inner member while the outer surface of the same is formed by the inner surface of the skirt of the outer member while the lower surface is formed by an annular inwardly projecting ring 16 around the bottom of the skirt. This ring can be conveniently screw threaded to the bottom of the said skirt to allow of the introduction of the same after the inner member has been placed in position. The control of the movement between the inner and outer members is brought about by the flow of oil into and out of the upper chamber 7 and the lower annular chamber 8.

An oilway 9 is provided in the connecting rod 4 connecting the pressure lubricating oil supply to the small end bearing and thence by means of an annular passage 10 encircling the bearing sleeve to a hole 10a in the upper side of the small end of the rod. Alternatively, if the piston pin is fixed in the small end and a bearing sleeve is not provided, the annular passage may encircle the pin or a hole may be provided through the pin. The outer periphery of this end of the connecting rod is formed part cylindrical or part spherical and has a hollow member 10b pressing thereon to form a seal around the hole. This hollow member is a sliding fit in a recess in the underside of the head of the inner cup-like shaped member and is urged to contact the end of the connecting rod at all times by a spring 10c. Alternatively, fixed mating surfaces may be provided with suitable clearances. The oil passes by way of an axial bore 10d in the hollow member to a non-return valve 11 from which is passes to the upper chamber. Oil also passes by way of another non-return valve 12 and passage to the lower chamber 8. To limit the pressure developed in the oil chambers by the inertia force of the oil in the connecting rod particularly at high engine speeds, the lift of the non-return valves may be limited or alternatively restricting orifices may be arranged at suitable points on the oil passages in the piston or connecting rod supplying the chambers.

The outer surface of the inner cup-like shaped member has an annular groove formed between the lower chamber and the head of the same thereby providing two lands 18 and 19 while a relief hole 17 is provided in the wall of the inner member to prevent a build-up of pressure by leakage of oil past the lands, which pressure would impose a load on the walls of both portions of the piston. When the walls of the inner and outer members can be made sufficiently strong to withstand this load, the relief hole and groove may be omitted in order to improve the sealing of both upper and lower oil chambers.

Figure 4:
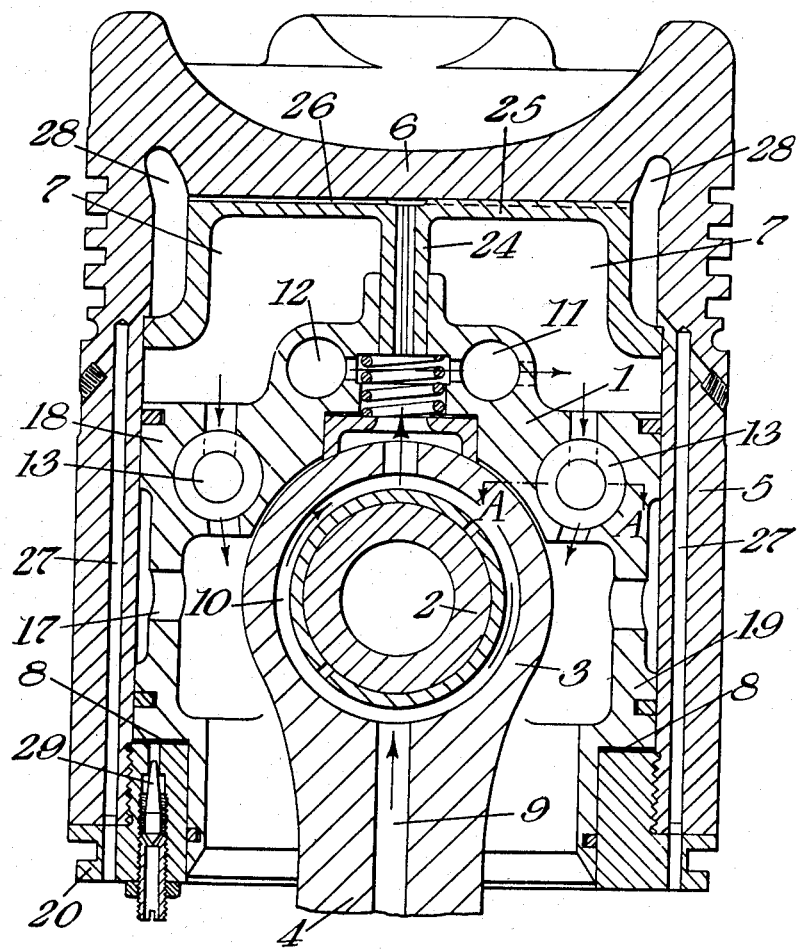
Figure 4 is a cross section of a still further form of piston.

Sealing rings may be used to close the leakage paths formed by the clearances between the inner and outer portions of the piston as shown in Figure 4.

Discharge of oil from the upper chamber takes place through a relief valve comprising laminated circular plates 13 of spring steel which may be of progressively decreasing diameter positioned coaxial with the inner cup-like shaped member 1 and forming part of the upper surface thereof. The upper most circular plate bears around its periphery against a seating ring 14 and oil passing this valve drains via holes 15 to the engine sump. Discharge of oil from the lower chamber occurs downwards through the clearance between the inner member of the piston and the ring 16 forming the lower boundary of the lower oil chamber and upwards through the clearance between the inner and outer members of the piston. Alternatively discharge of oil through these paths is limited by making the clearances small and/or using sealing rings and the major part of the discharge occurs through an orifice discharging either downwards directly into the sump, or upwards and via a relief hole or holes in the inner part of the piston to the sump.

The action is as follows: During the latter part of each exhaust stroke and the first part of the induction stroke, the force due to the inertia of the outer member of the piston and the inertia of the oil in the upper chamber and to some extent the inertia of the column of oil in the connecting rod acts on the oil in the lower chamber, causing an amount to flow out through the discharge path and thus moving the outer part a very small distance (of the order of a few thousandths of an inch) upwards relative to the inner part. At the same time, the upper oil chamber increases in volume, and oil flows into it via the non-return valve 11. If the engine load has just been reduced, so that the maximum pressure is lower than that required to operate the relief valve, i. e. the condition under which an increase in compression radio is required, this process is repeated on each engine cycle without other event until the compression ratio giving the prearranged maximum pressure which operates the relief valve is reached. The next small upward movement raises the compression ratio slightly above the required value and hence the maximum cylinder pressure slightly exceeds the value necessary to overcome the relief valve 13 which then opens and discharges a small amount of oil, thus bringing the outer portion of the piston down a small distance relative to the inner part. If the engine load now remains steady at the low value, the outer part of the piston continues to move up and down very slightly relatively to the inner part on each cycle, its means relative position being that giving the value of maximum cylinder pressure determined by the relief valve opening pressure.

If the engine throttle is now opened, the cylinder pressure will tend to rise much above the value required to open the relief valve 13, but as this valve opens and provides a considerable discharge area, oil from the upper chamber 7 is rapidly discharged so that the outer portion of the piston moves down rapidly in relation to the inner part, and the clearance volume is increased thus maintaining the maximum cylinder pressure close to the pre-arranged value.

The piston thus adjusts itself at a limited rate to a reduction in engine load, this rate being determined by the area provided for leakage from the lower chamber. There is no need for a rapid increase in compression ratio and moreover a large relative upward movement of the outer part of the piston on each cycle would be undesirable since at constant load it would result in an equally large downward movement on each cycle, and hence an appreciable wastage of power in pumping oil. On the other hand, it is desirable that the piston should respond as rapidly as possible to a sudden increase in the rate of fuel supply to the engine in order to avoid excessive cylinder pressure and resultant detonation and/or high stresses. The rate of adjustment is determined by the relief valve 13. The above described arrangement giving a very rapid response by virtue of the large area uncovered at the periphery of a small movement, and freedom from differential effect, which makes some types of valve close at a pressure substantially lower than the opening pressure.

Until the designed minimum compression ratio is reached the portion of the piston subjected to the gas pressure is supported on oil in the top chamber 7 and therefore the gas pressure produces no bending stresses in the crown, which serves only to separate the gas and the oil. The crown has therefore to be designed to carry only its own inertia load and that of the oil, both of which will act on it toward the end of the exhaust stroke and during the first part of the introduction stroke. When the designed minimum compression ratio is reached the inner surface of the head of the outer part of the piston rests on suitable surfaces provided on the top of the inner part of the piston.

Figure 5:
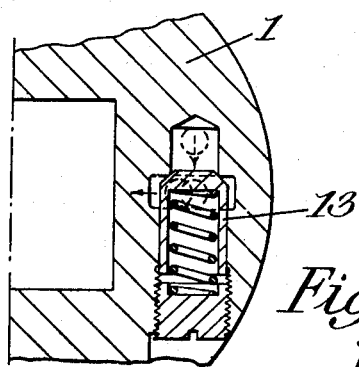
Figure 5 is a plan taken on the line A—A of Figure 4, and Figures 6 and 7 are cross sections of still further forms of piston.

Instead of the laminated relief valve 13, spring loaded valves 13 of known type may be arranged through and around the head of the inner cup-like shaped member as shown in Figures 4 and 5 which discharge directly into the space inside the inner member 1 and thence to the engine sump. In Figure 4 the passage of cooling oil to the piston crown is by way of a hollow central stem 24 which is fixed at one end to the head of the outer member 5 and which slides in a bore in the inner member 1 and by which the oil is conveyed from the piston pin 2 to radial passages 26 formed between the inner surface of the head 6 of the outer member 5 and a radially grooved plate 25 abutting thereon, the plate forming the upper boundary of the upper chamber 7. The radial cooling passages 26 discharge the oil into an annular space 28 in which the oil is shaken to and fro thus cooling the piston ring belt, after which it is discharged to the engine sump via passage 27.

In this design, as in the previous one, the piston crown is free of bending stress, the gas load being transmitted to the oil via the crown and oil passage plate, producing only compression in these members. Accordingly the piston crown may be thinner than in the normal design of piston, and a given flow of cooling oil is then more effective in maintaining acceptable temperatures at the combustion chamber surface of the piston crown.

An additional adjustable discharge orifice 29 may be provided to give additional area for leakage from the lower oil chamber, thus allowing adjustment of the rate of recovery of the piston on throwing off the load.

Figure 6:
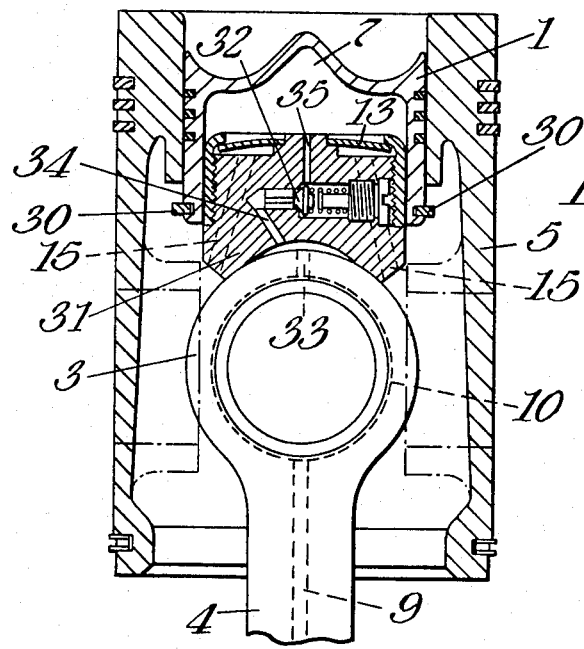

In a further construction for use in a two-stroke cycle compression ignition engine and shown in Figure 6, the outer portion 5 of the piston is formed as a cylinder having an axial bore in which the inner member 1 is axially slidable, resulting in changes of the clearance volume with changes of load. The movable part of the piston head comprises an inverted cup-like member 1 slidable in the bore of the cylindrical portion, being provided with a ring 30 sprung into a groove in the lower end of the skirt thereof which limits the extent of the upward movement thereof. The internal bore of the cup-like member has a third part 31 of cylindrical shape which is a sliding fit in the former and provides the lower boundary of the chamber 7 formed between its upper surface and the head of the movable part of the piston. The third part is machined on its lower face to form a bearing on the cylindrical or spherical outer surface of the small end of the connecting rod. This third part is provided with a disc-like relief valve 13 of the kind referred to in the first embodiment for discharging oil from the oil chamber 7 to the sump when the oil pressure exceeds a selected value, while a non-return valve 32 is provided between the oil chamber and the oil supply from the small end bearing.

In this application to a two-stroke cycle engine no lower oil chamber is required since the resultant of the gas and inertia forces acting on the cup-like member and the third part is always a force acting downwards. Downward movement of the cup-like member when the cylinder pressure rises above the limiting value is permitted, as in the previous cases, by the opening of the relief valve 13. Upward movement of the piston is effected by passage of oil under pressure via the non-return inlet valve 32 to the chamber 7. This can occur, with a normal lubrication system oil pressure, during the scavenge period, when the gas pressure is very small, since the inertia load of the cup-like member is small. The mass of the third part 31 is considerably greater but at low speeds this part may be lifted slightly thus allowing oil from the connecting rod to escape between the bearing surfaces on this part and the end of the connecting rod. This is not detrimental. An adjustable restricting device may be fitted to one or more of the oil supply passages 33, 34 or 35 to obtain suitable flow areas.

Thus the variation in compression ratio can be obtained without producing variations in the timing of ports controlled by the piston, but if it is desirable to vary the port timings in accordance with the compression ratio, the periphery of the piston crown may form part of the relatively movable portion of the piston.

Figure 7:
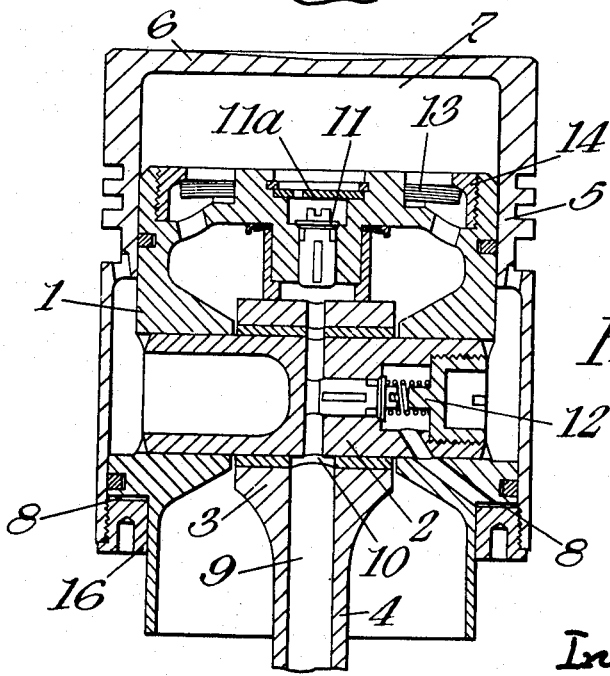

Figure 7 shows an arrangement in which the non-return valve 12 controlling the flow of oil to the bottom chamber 8 is provided inside the piston pin 2, while the flow of oil to the upper chamber 7 is by way of the non-return valve 11 and the restricted orifice in the plate 11a to limit the flow of oil to the upper chamber, otherwise the arrangement is normal and operates in the manner previously described in reference to Figures 1, 2 and 3.

Alternatively, substantially the same result may be obtained by making the length of the connecting rod variable, the necessary oil chamber or chambers being provided with the associated non-return and relief valves as required. Other details for carrying the invention into effect may be varied without departing from the scope of the invention.

Two of the requirements for maximum thermal efficiency in the piston type internal combustion engine are:

Firstly, that at each and every point within the load range of the engine the work expended in providing the air or fuel air mixture should not be excessive, and Secondly, that the highest expansion ratio should be used, to obtain which, the air or air fuel mixture must be compressed by the piston to the greatest extent possible within the ultimate limitations of the cycle. These limitations are determined by detonation in the Otto cycle engine, and limiting mechanical stresses in the compression ignition engine and in normal engines these limits are approached at full load only, while higher compression ratios are desirable at part loads. This second requirement like the first implies that the air quantity should not be unnecessarily large since this would render impossible the use of the maximum compression ratio appropriate to the load.

Fulfilment of these two requirements is essential if the maximum possible efficiency is to be obtained, and they cannot be achieved by an engine having a fixed compression ratio or in which the quantity of fresh charge used per cycle is constant, or controlled by a throttle valve.

Improved performance of an internal combustion engine having means for varying the compression ratio may be obtained by including an air or air fuel mixture delivery machine which is adjusted to vary the amount of air or mixture delivered to the engine. The compression ratio may be automatically adjusted to increase with decrease of the load and decrease with increase of the load to maintain a substantially constant maximum pressure in the cylinder or cylinders of the engine while the delivery machine is adjusted directly or indirectly from the normal controls of the engine.

Assuming that for operating at full load all engines are constructed to have the highest permissible fixed compression ratio, and the optimum quantity of fresh charge compatible with the other features of their design and construction, then no claim is made per se for improvement in the thermal efficiency at full load, but only at part load. Many engines operate at part load for a large proportion of their lives. The proposals made hereinafter are particularly advantageous in pressure charged engines and the combination proposed enables the degree of pressure charging to be increased, whereby the ratio between full load and no load is increased, so that greater improvements are obtainable, while the starting of highly pressure charged engines is greatly facilitated.

A variable delivery machine can be arranged to operate as a compressor and/or expander and in which the compression and expansion are positive actions occurring within the machine. The machine can be controlled to give a variable throughput, whereby, for example, the fresh charge delivered to an internal combustion engine may be provided in suitably limited quantity for any condition of engine load, without unnecessary expenditure of work, and with some return of work to the engine when the machine is operating as an expander.

The construction of an engine embodying both variable compression and variable delivery of fresh charge is particularly advantageous, since the improvement in efficiency obtainable by the use of both arrangements is greater than the sum of the improvements given by the two individual arrangements.

In the case of a four-stroke cycle compression ignition engine pressure-charged by a positive displacement compressor mechanically driven from the engine, the quantity and pressure of the air supplied remains substantially constant at all engine loads, and is by necessity that required for the full-load running condition. At part loads, unnecessary work is done in compressing air which is not required for combustion or scavenging purposes, so that the efficiency of the cycle is below the maximum. Fitting a variable delivery compressor to the engine, in place of the normal pressure charger, permits a reduction in the quantity of air delivered to the engine at part loads, and thus a reduction in the power taken by the compressor, with a consequent increase in cycle efficiency. However, only a limited reduction in air quantity can be tolerated by the engine before the temperature and pressure of the air becomes too low for the low fixed compression ratio, selected to suit full-load conditions, to raise them to the values at which satisfactory combustion can take place.

Variable compression by itself improves efficiency by increasing the compression ratio at part loads. With highly pressure charged engines, having a fixed compression ratio, it is necessary to use a relatively low ratio to avoid too high stresses at full load, and starting becomes difficult, but with the provision of variable compression this difficulty is overcome by providing a high compression ratio for starting. However, variable compression cannot give the improvement mentioned above which results from reduction of the air quantity at part loads.

If a variable delivery machine is used in conjunction with variable compression, not only is the efficiency of the cycle improved as the air quantity is reduced, but also the limit to which the air quantity may be reduced is extended. Variable compression permits the full use of the variable delivery and vice versa, since the reduction in air quantity at part loads given by the variable delivery machine, allows the variable compression arrangement to utilise higher compression ratios than could be used with normal air quantities, and produces the temperature and pressure conditions required for satisfactory combustion.

In an engine pressure charged by an exhaust gas turbo blower, and utilizing the variable compression arrangement, the conditions, to a degree, satisfy the requirements for maximum thermal efficiency, since decreased engine load is accompanied by decreased exhaust energy and thus of the quantity and pressure of the air delivered to the engine. However, the load to charge quantity relationships approach the optimum for one speed only, and to obtain the best conditions for all loads and speeds the exhaust gas turbine requires to be fitted with means for providing a variable nozzle area and should drive either an aero-dynamic compressor with variable diffusers or a positive displacement compressor.

In the four-stroke Otto cycle engine the air fuel ratio must be maintained approximately constant at all loads. While air/fuel ratios somewhat above the stoichiometrical ratio give an improvement in thermal efficiency, a large excess of air results in slow burning, while further weakening of the mixture results in failure to ignite. In the conventional engine the unwanted air is excluded at part loads by means of a throttle, which greatly increases the pumping loss of the engine. Thus the work expended in providing the fresh charge of fuel air mixture under part load conditions is greater than it should be, and the first of the previously mentioned requirements for maximum thermal efficiency is not met. Use of a variable delivery machine overcomes this deficiency and it must be noted that when the delivery of the machine drops below the volumetric capacity of the engine, the former becomes an expanding machine. In this case the required amount of fresh charge is taken into the machine at near atmospheric pressure and is expanded down to the engine inlet manifold sub-atmospheric pressure. This expansion process produces useful work which is transmitted to the engine shaft and largely offsets the engine pumping loss. The minimum load which may be reached by increasing the degree of expansion is limited by the fact that the expansion process greatly cools the air, so that ignition and combustion are adversely affected. If the variable delivery machine is used in conjunction with the variable compression arrangement, this defect is overcome, since the increased compression ratio obtained as the charge pressure is decreased, provides an adequate compression temperature, even at the lowest loads. Use of the variable compression arrangement, without the variable delivery machine gives improved part load economy over the normal Otto cycle engine, but the improvement is not so great as with the combined scheme, because the normal pumping losses are incurred, and the compression ratio reached at any part load is less than when the variable delivery machine is also used. The latter, when expanding the charge, also cools it appreciably, so that a given quantity of charge occupies less volume than normal. Thus the pressure of the fresh charge is lower than with the uncooled charge, and a higher compression ratio can be used before the limiting cylinder conditions at which detonation occurs are reached. In this way, the practical working range of both the variable delivery machine and the variable compression arrangement is extended and the combination gives an improved result greater than the sum of the improvements obtainable by the separate use of these devices.

The immediately preceding description relates to an atmospherically charged Otto cycle engine, and it should be understood that still greater improvement is obtainable in a pressure charged engine, because the range of charge pressure is greater; that is to say the ratio between full-load and no-load conditions is greater. The pressure charged engine is already provided with a compressor, so that this requires to be replaced by a variable delivery machine, and no extra units are required.

When an engine is fitted with a variable delivery machine through which the fresh charge is passed to the engine, the question of whether the engine is pressure-charged or not depends upon the relative displacements of the engine and machine. If the maximum displacement of the variable delivery machine per unit of time is greater than that of the engine, then the engine is pressure charged; if it is equal to or less than that of the engine, then the engine is not pressure-charged.

In the case of two-stroke cycle engines operating on either the compression ignition or Otto cycles the advantages of the combination apply to pressure charged engines only, and it should be noted that many so-called blower-scavenged engines are pressure-charged in accordance with the above definition. In two-stroke cycle engines the pressure of the scavenging medium cannot be reduced much below atmospheric pressure, since the pressure of the gases in the exhaust system, apart from fluctuations, is close to atmospheric pressure. The use of a variable delivery compressor to provide the pressure charge ensures that energy is not wasted in compressing an excessive quantity of fresh charge at part loads but with this device alone the maximum pressure charge which can be achieved is limited by the fixed compression ratio of the engine. This fixed ratio requires to be reduced as the degree of pressure charging is increased, and a limit is reached when poor starting, and low thermal efficiency over the whole load range, make it uneconomical to increase the charging pressure further. If the variable compression arrangement is also used, a high compression ratio is provided for starting, and at all loads the highest practical expansion ratio is obtained. The engine is still relatively uneconomical at full load unless use is made of the energy in the exhaust gases, which energy increases as the charging pressure is increased as a result of the necessity of operating with reduced compression and expansion ratios.

For the efficient utilisation of high charging pressures some form of compounding should be used. This is usually done by means of an exhaust gas turbine and the cycles are called the compound engine and gas generator cycles. In the compound engine scheme the turbine output becomes part of the gross set output, and the turbine may be geared to the engine crankshaft or provide a separate shaft output. With the gas generator scheme all the useful engine output is used to drive the pressure charger and the total set output is taken from the turbine. The use of these two cycles is handicapped by the difficulties of starting and of obtaining light load economy. The former is a result of the low compression ratio which has to be employed to limit the maximum pressure at full load. The latter results from a combination of the low compression ratio and the excessive quantity of air delivered by the positive displacement compressor at the minimum engine speed.

The disadvantages are overcome by the use of variable compression ratio and a variable delivery compressor. The use of a variable compression ratio ensures that a high compression ratio exists for starting and that the compression ratio is suitable for the degree of pressure charge existing at all points in the load range. The variable delivery compressor permits a reduction in the quantity of air delivered per cycle so that at the minimum engine speed the total air throughput and charge pressure are reduced. This causes a drop in compressor work and because of this the engine requires less fuel to keep the unit in operation, so improving light load and idling economy. This can not be done without a variable compression arrangement in the engine as the charge pressure becomes too low for compression ignition to take place. Full advantage of the variable compression ratio device can not be made if a constant delivery compressor is used as the weight of air delivered per cycle when idling is then the same as at full load. The engine output has to be sufficient to maintain this flow and so an appreciable quantity of fuel is used in producing exhaust energy which is wasted. Variation of compression ratio under these conditions alters the efficiency with which the waste exhaust energy is produced but can not stop the loss itself. Only by reducing the quantity of air delivered per cycle can the waste exhaust energy be appreciably reduced and full use made of the variable compression device.

As the degree of pressure charging of four-stroke cycle engines is increased a condition is reached where the energy in the exhaust gases is considerably in excess of that required to provide the pressure charge, and for the cycle to remain economic it is necessary to apply compounding with a turbine, or other type of expanding machine. This condition arises at a higher load than with the two-stroke cycle engine, but the conditions and advantages described above for the two-stroke cycle engine also apply to the four-stroke cycle engine.

In an alternative embodiment of the invention the internal combustion engine is turbo-charged and has means to vary the compression ratio and expansion ratio and in which the effective compression stroke is less than the effective expansion stroke. The turbo-charging system is preferably arranged to produce the greatest possible transference of energy from the exhaust gases to the charge air while a still further feature is that the air is preferably cooled during and/or after its compression and prior to passing into the engine cylinder.

As previously explained, the use of a means for varying the compression and expansion ratios in the working cylinder of a turbo-charged internal combustion engine confers the advantage that at all loads the highest expansion ratio and hence the highest thermal efficiency may be obtained consistent with the permissible maximum cylinder pressure. Hence at loads below the maximum load of the corresponding fixed-ratio engine, the variable-ratio engine has a higher efficiency. For a given limiting maximum cylinder pressure, the variable-ratio engine can also carry higher loads than the fixed ratio engine by virtue of a reduction in ratio below the value of the fixed ratio which latter is a compromise for the load range.

Another advantageous condition in a turbo-charged engine may be obtained as follows: The turbo-charging system is arranged to produce the greatest possible transference of energy from the exhaust gases to the charge air the pressure of which is thereby increased, and the effective compression-ratio in the engine cylinder is reduced by modification of the valve or port timings so that approximately the same compression pressure is reached. This increased external compression of the charge air and reduction of the engine compression ratio result in a saving in the net work performed by the piston on the air charge, and a consequent reduction in fuel consumption, since the increased external compression is obtained from exhaust energy with little or no increase in fuel consumption. Tests have shown that as the degree of pressure charging is increased, the exhaust energy available, when the engine is running at full load, is greater than that required to compress the charge air to the pressure which, with a full utilization of the compression stroke, will give the permitted maximum cylinder pressure.

The method has the further advantage that a given coolant in an after-cooler can extract more heat from the air charge by virtue of the higher temperature of the more highly compressed charge. Hence, with a given cylinder pressure at the end of the reduced effective compression stroke, the compression temperature is lower and a greater weight of air is present in the cylinder, so that a higher load can be carried before limiting engine temperatures are reached. Moreover, the compression work of the piston is further reduced. Alternatively a given degree of charge cooling may be obtained with a smaller after-cooler or a coolant at a higher temperature than would be necessary in the normal case. In order to recuperate more of the energy of the exhaust gases in the form of energy in the charge air, the efficiency of the turbo-charger compression process may be improved by the use of an aftercooler, or intercoolers between two or more stages of compression.

A serious limitation of this method, when applied to a compression-ignition engine, and which has hindered its application, is that the use of a compression ratio substantially less than the expansion ratio is only practicable at high engine loads, since at part loads, the pressure of the air leaving the turbo-charger is insufficient to give the required pressure and temperature at the end of the reduced effective compression stroke to ensure satisfactory combustion. In fact it is necessary to provide means of restoring the valve or port timings to their normal values to permit starting and light load running of a compression-ignition engine having this feature.

This mechanical complication and the lower limit to the load range over which the improved cycle efficiency can be obtained is removed by combining the above system, which is distinguished chiefly by the condition that the ratio $$\frac{\text{expansion ratio}}{\text{compression ratio}}$$

is substantially greater than unity, with means referred to earlier whereby the compression and expansion ratios are varied so that an approximately constant maximum cylinder pressure is maintained throughout the load range. In an engine in which these features are combined, the variable-ratio means will ensure that the maximum cylinder pressures will be at the predetermined high value even at the lightest loads and hence the compression pressure and temperature will be even higher than at full load so that satisfactory part-load performance will be ensured, without changing the preferred valve or port timings. At full load in such an engine, the expansion-ratio may be approximately the same as in an engine having none of the special features, but at light-load, in order to maintain the predetermined maximum cylinder pressure, the variable-ratio means will act to compress the air charge into a very small clearance volume, because of the low air charge pressure at light load and the fact that one feature of the combination is a reduced effective compression stroke, i. e. a reduced volume of charge trapped in the cylinder. With this very small clearance volume and the normal effective expansion stroke which is retained throughout, (though the optimum valve or port timings may be somewhat modified by the use of the special features) the expansion ratio at light-load will be very large and the thermal efficiency will be high. Thus the advantage of the condition $$\frac{\text{expansion ratio}}{\text{compression ratio}} > 1$$

is retained throughout the load range.

The above considerations apply to both two-stroke cycle and four-stroke cycle compression-ignition engines. Suitable variable ratio means for these two types of engine are hereinbefore described. The required reduction in the effective compression stroke may be obtained in four-stroke cycle engines by closing the air valve at a point in the piston stroke when the volume of the cylinder is substantially less than the full volume. The precise timing would depend as explained earlier on the pressure to which the charge air could be raised by the turbo-charger and would be arranged so that at full load, with the variable-ratio means set to give the maximum permissible cylinder pressure, the clearance volume would be sufficient to contain the necessary air charge for the combustion of the fuel, but not greatly exceed this size, since with the given piston stroke the use of an unnecessarily large clearance volume would result in an unnecessarily short expansion ratio. In two-stroke cycle engines the reduced effective compression stroke may be obtained by closing the exhaust valve when the volume present in the cylinder is substantially less than the full volume, or by equivalent arrangement of the inlet or exhaust ports. Any of the known methods of assisting the turbo-charger of a two-stroke cycle engine may be employed in the arrangement according to the invention e. g. a positive displacement blower mechanically driven by the engine may be used in series or in parallel with the turbo-charger.

The immediately foregoing description of the invention has been particularly directed to compression ignition engines, but it is to be understood that advantages can also be obtained by the application of the invention to turbo-charged internal combustion engines provided with means for varying the clearance volume in a cylinder or cylinders of the same, in which the charge is a combustible mixture, for example in petrol engines provided with a carburetted mixture.

I claim:

1. Piston for an internal combustion engine having a crown portion and parts capable of limited relative movement defining a first chamber and a second chamber, such relative movement in one direction increasing the distance between the crown portion of the piston and the means for converting reciprocating movement of the piston into rotary motion of the engine output shaft and also increasing the internal volume of the first chamber and decreasing the internal volume of the second chamber whilst such relative movement in the other direction decreases the said distance and also decreases the internal volume of the first chamber and increases the internal volume of the second chamber, a supply passage adapted to receive incompressible fluid under pressure from a source external to the piston, a first inlet passage communicating between the supply passage and the first chamber, a second inlet passage communicating between the supply passage and the second chamber, a first non-return valve permitting flow of fluid through the first passage towards the first chamber, a second non-return valve permitting flow through the second passage towards the second chamber, a first discharge passage leading from the first chamber, a discharge valve controlling flow of fluid from the first chamber through the first discharge passage to a zone of pressure lower than the supply pressure, a second discharge passage leading from the second chamber and controlling the flow of fluid from the second chamber to a zone of pressure lower than the supply pressure, and sealing means for substantially preventing the flow of fluid from the first chamber into the second chamber and from the second chamber into the first chamber.

2. Piston for internal combustion engine having a crown portion and comprising two main parts defining between them a first chamber and a second chamber, the said two parts being arranged for limited relative movement to change the clearance volume of a cylinder in which the said piston works by changing the distance of the said crown portion of the piston from the means for converting reciprocating motion of the piston into rotary motion of the engine output shaft, the first chamber being reduced and the second chamber increased in internal volume when the said distance is reduced and vice versa, a first inlet passage adapted for the flow of incompressible fluid into the first chamber, a second inlet passage adapted for the flow of incompressible fluid into the second chamber, a first non-return valve in the first passage open for flow into the first chamber, a second non-return valve in the second passage open for flow into the second chamber, the first and second passages being independent of one another at least on the sides of the first and second non-return valves nearest to the first and second chambers respectively, a third output passage adapted for the discharge of incompressible fluid from the first chamber to a zone of low pressure, a fourth output passage adapted for the discharge of incompressible fluid from the second chamber to a zone of low pressure, an automatic discharge valve adapted to control the flow of fluid through the third passage and to permit such flow only when the pressure in the first chamber exceeds a predetermined value, a constriction in the fourth passage for controlling the rate at which fluid may be discharged from the second chamber, and sealing means for substantially preventing the flow of fluid from the first chamber to the second and from the second chamber to the first.

3. An internal combustion engine with means for automatically varying the compression ratio comprising at least one piston having a crown portion and two main parts defining between them a first chamber and a second chamber, the said two parts being arranged for limited relative movement to change the clearance volume of a cylinder of the engine in which the said piston works by changing the distance of the crown portion of the piston from the means for converting reciprocating motion of the piston into rotary motion of the engine output shaft, the first chamber being reduced and the second chamber increased in internal volume when the said distance is reduced and vice versa, a first input passage communicating between a source of incompressible fluid under pressure and the first chamber through a first non-return valve permitting flow towards the first chamber, a second input passage separate from the first passage and communicating between a source of incompressible fluid under pressure and the second chamber through a second non-return valve permitting flow towards the second chamber, a first discharge passage leading from the first chamber, a valve controlling the flow of incompressible fluid through the first discharge passage to a zone of pressure lower than the supply pressure so as to prevent flow unless the pressure of the said fluid in the first passage exceeds a predetermined value in the event of the pressure in the said cylinder bearing on the said crown portion of the piston exceeding a predetermined value, so that, in such event relative movement of the said main parts of the piston takes place to reduce the said distance, a second discharge passage leading from the second chamber to a zone of pressure lower than the supply pressure adapted to control the flow of the said fluid from the second chamber and so to control relative movement of the said main parts of the piston in a direction such as to increase the said distance during low cylinder pressure phases of an engine cycle during which the said distance has been reduced and during immediately succeeding cycles when the cylinder pressure is below the said predetermined cylinder pressure, and sealing means for substantially preventing the flow of the said fluid from either of the said chambers into the other.

4. An internal combustion engine according to claim 3 comprising a crank shaft, a connecting rod interconnecting the same with the said piston, a first oil-way in the crank shaft and means for supplying thereto oil under pressure, a second oil-way in the connecting rod, a first connecting passage in the big end bearing of the connecting rod upon the crank pin of the crankshaft providing communication between the first and second oil-ways and a second communicating passage communicating between the second oil-way and the said first and second passages leading to the said first and second chambers respectively in the said piston.

5. Piston as claimed in claim 1 comprising an outer cup shaped member containing the crown of the piston and an inner member mounted within a cylindrical wall of the outer member and axially movable therein, the first chamber being bounded by an external end face of the inner member, an internal end face of the outer member and the said cylindrical wall of the outer member.

6. Piston as claimed in claim 5 in which the second chamber is formed between a stepped region on the inner member having a smaller diameter at the end remote from the first chamber and an inwardly positioned flange on the said cylindrical wall of the outer member at the end thereof remote from the first chamber.

7. Piston as claimed in claim 6 in which an annular clearance between the said inwardly positioned flange and the said smaller diameter of the inner member forms the second discharge passage.

References Cited in the file of this patent

UNITED STATES PATENTS

| | | |
|---|---|---|
| 1,741,729 | Newton | Dec. 31, 1929 |
| 1,825,163 | Schweter | Sept. 29, 1931 |
| 1,926,598 | Peterson | Sept. 12, 1933 |
| 2,292,233 | Lysholm | Aug. 4, 1942 |
| 2,392,371 | Fisher | Jan. 8, 1946 |
| 2,573,688 | Butler | Nov. 6, 1951 |
| 2,573,689 | Butler | Nov. 6, 1951 |
| 2,670,724 | Reggio | Mar. 2, 1954 |